Sept. 14, 1965  A. FERRANTI  3,206,220
ARRANGEMENT AND RADIAL HOLDING OF BARS, SHAFTS
AND THE LIKE DURING TURNING THEREOF
BY MEANS OF ROTARY TOOLS
Filed Oct. 2, 1962

INVENTOR.
Albino Ferranti
By Watson, Cole, Grindle & Watson
ATTORNEYS

United States Patent Office 3,206,220
Patented Sept. 14, 1965

3,206,220
ARRANGEMENT AND RADIAL HOLDING OF BARS, SHAFTS AND THE LIKE DURING TURNING THEREOF BY MEANS OF ROTARY TOOLS
Albino Ferranti, Viale Marche 97, Milan, Italy
Filed Oct. 2, 1962, Ser. No. 227,750
Claims priority, application Italy, Oct. 16, 1961, 18,696/61
4 Claims. (Cl. 279—23)

Present invention refers to an arrangement for achieving a vibration-free safe holding of bars during machining thereof, for instance, during a turning operation of the same by means of rotary tools.

This invention can particularly but not exclusively be applied to the turning operation of very long bars to embody, for instance, shafts, well drills etc.

It is known that turning of long bars is carried out on particular lathes provided with a lathe bed, whereon slides a carriage, which holds safely the bar to be turned; at the other end of said lathe bed there is provided a drilled turntable with associated tools, that in co-operation with the bar contour carry out turning thereof.

These known machine tools have guide members of the bar to be turned, said guide members providing a safe centering of the bar with respect to the rotation axis of the tool turntable. These guide members do not comply with the requirements as desired and the turned bar has faults and irregularities, inasmuch the guide members co-operate with the bar periphery in a rigid way without any possibility of radial motion.

The arrangement according to the invention provides resilient plate diaphragms which eliminate any vibration and allows diameter alternations, even though confined, of the workpiece during the advance motion thereof.

The device according to present invention provides a simple and satisfactory solution of the question as above referred to, in the sense that, even though the bar to be worked has some irregularities on its diameter, it is kept centered and, as a result, the axis thereof remains straight in such a way that it is possible to achieve very straight bars even though they are very long. Moreover, the device can advantageously be used to bore very long holes.

The device according to the invention is characterized by at least a drilled plate provided with resilient segmental parts capable of bending and having at their free peripheral end shaped surfaces co-operating with the surface of the work to lock radially this latter by allowing an axial motion thereof during its turning operation.

The plate is held, according to the invention, against its support by bearings in such a way that this plate co-operating at its shaped ends with the work can rotate in respect of the associated support and the plate individual segmental members during the axial advance motion of the bar by keeping this latter rigidly centered in radial direction during its advance motion.

The invention will now be described by the following specification referring to the accompanying drawings, which is given by way of example only and showing a preferred embodiment of the device according to the invention.

Figure 1:
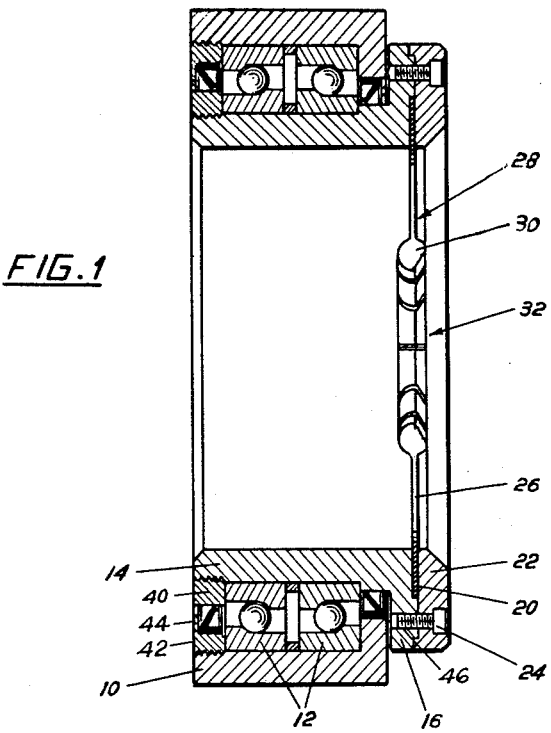
FIG. 1 is an axial section of a preferred embodiment of the device according to the invention.
Figure 2:
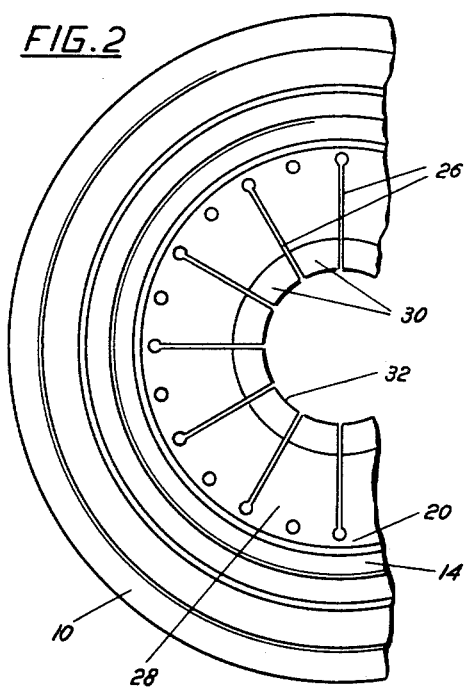
FIG. 2 is part front view.

With reference to the figures of the drawing, the device has a support ring 10 forming part of a lathe. For instance, the support ring can be provided on the headstock or on the bar guide supports.

The ring 10 holds through bearings 12 a counter-ring 14 having at one of its ends a rim 16 provided with a front abutment accommodating the outer peripheral part of a drilled disc or circular plate 20, which is secured to the counter-ring 14 through a flange 22 and screws 24 engaged with rim 16. The circular plate 20 is made by a flexible material as, for instance, steel, and provides radial cuts 26 to form resilient segmental members 28 terminating with shaped heads 30 in the plate center hole. Screw elements or ring nuts 40 and 42 hold bearings 12 in place. The ring nuts are screwed into threaded recesses in counter-ring 14 and ring 10, respectively. Ring nut 42 is provided with a gasket 44 adapted to prevent lubricant escaping therefrom. A similar gasket 46 is provided on the opposite side of said bearings for the same purpose.

Figure 3:
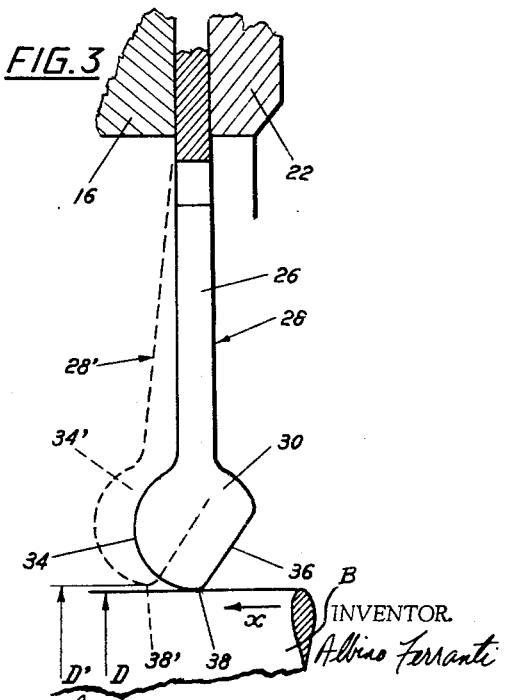
FIG. 3 shows on an enlarged scale a sectional view of one of the resilient segmental members of the device.

As shown in FIG. 3, each head confines the circular opening 32 into which bar B is introduced and slides, said head (as seen in the advance motion direction $x$ of bar B) having a circular back length 34 and a straight front length 36 with such a slope as to converge on the front part towards the direction $x$. These two surfaces 34 and 36 are connected to each other by a connection surface 38, whose bending radius is very reduced as to bending radius of the surface 34. The connection surface 38 is the proper surface engaging with the peripheral contour of bar B.

By taking now into account the turning operation of bar B and supposing that the headstock has two devices as above referred to arranged behind the tools and suitably spaced from one another, in this case bar B enters hole 32 of circular plate 20 during the turning operation so that the bent surfaces 38 of the resilient segmental member heads 30 engage with the peripheral outline of bar B to hold firmly this latter and prevent any radial motion thereof during its turning.

Bar B engages in succession during its advance motion in the direction of arrow $x$ the second device of the headstock and is held in such a way just on the same axis of said headstock.

If the peripheral contour of bar B has some irregularities or diameter differences, then these alternations are perceived by the bent surfaces 38 of segmental members 28, which are more or less bent resiliently to take the position as indicated by the dash line in FIG. 3 and lock in such a way the work radially by enabling, however, the axial sliding motion thereof.

In said figure the bent surfaces 38 confine a turning diameter D and if they are bent, motion thereof takes place along a circle arc till the position 38′, whereto such a turning diameter $D_1$ corresponds, which is greater than the first-mentioned diameter D.

The diameter alternations of bar B are therefore compensated automatically in such a way that its axis registers always with the rotation axis of headstock, that is, this bar cannot perform any radial or oscillation movement.

It is to be understood that owing to the resiliency of segmental parts 28 the advance motion of bar B takes place always in a regular way and possible irregularities or diameter alternations of said bar do not prevent such a bar from performing its regular advance motion, and its radial locking is always maintained during its rotation. These conditions cannot be achieved in the devices of the prior art inasmuch as if these devices provided rigid guide members, these latter prevented the regular advance motion of bar B or if said known devices provided spring means to enable a radial motion depending on the bar diameter alternations, then bar holding stability and stiffness is prevented and turning thereof is faulty owing to the bar vibrations.

It is to be understood that present device might be submitted to modifications and changes. For instance, it could be embodied in such a way as to allow the hole boring; in this case one or more circular plates 20 are secured through bearings 12 to the boring bar in such a way that the heads 30 of segmental parts 28 provided at the outside periphery of circular plates 20 co-operate with the inside walls of the hole to be bored. In such a way it is possible to carry out an advantageous and careful boring of very long bores without the need for supporting the boring bar at its end, whereby it is possible to bore also blind holes with a greater depth.

The thickness of segmental members 28 can be modified radially to achieve a controlled bending thereof or in a like way said segmental members might be associated with complementary resilient plates which intervene depending on the bending degree of individual segmental members and anyway, they might be formed by more superimposed plates.

The heads 30 might also be applied to segmental members 28 and in such a case they could be made of a hard metal or other suitable material.

It is to be understood that present invention covers also the headstock and the boring bar embodying at least one device according to the invention.

It is to be understood that the embodiment details of the invention can be altered without departing from the spirit of the invention or the scope of the appended claims.

I claim:

1. A device for radially clamping a workpiece in a lathe, wherein said workpiece is supported by a movable carriage along the bench of the lathe, said device comprising a substantially flat plate including resilient segmental members having shaped heads at their free ends, each of said shaped heads, as seen in the direction of the workpiece advance motion, having a substantially cylindrical rear surface and an inclined front surface, said surfaces converging towards a juncture at the point of contact with said workpiece, said juncture being cylindrical and having a radius less than the radius of said rear cylindrical surface, whereby said shaped heads radially clamp said workpiece allowing free axial displacement thereof.

2. A device as claimed in claim 1, wherein said resilient segmental members extend in a converging direction and said shaped heads jointly define a hole in said plate to receive said workpiece.

3. A device as claimed in claim 1, wherein said plate is rotatably mounted whereby said plate together with said workpiece may be rotated.

4. A device for radially clamping a workpiece in a lathe, wherein said workpiece is supported by a movable carriage along the bench of the lathe, said device comprising a substantially flat plate including resilient segmental members having shaped heads at their free ends, said shaped heads jointly defining a hole in said plate, said hole being adapted to receive said workpiece, whereby said shaped heads radially clamp said workpiece allowing free axial displacement thereof, as seen in the direction of the workpiece advance motion, having a substantially cylindrical rear surface and an inclined front surface, said surfaces converging towards a juncture at the point of contact with said workpiece, said juncture being cylindrical and having a radius less than the radius of said rear surface.

References Cited by the Examiner

UNITED STATES PATENTS

| 1,939,644 | 12/33 | Bechert | 279—46 |
|-----------|-------|---------|--------|
| 2,355,853 | 8/44 | Foxon. | |
| 2,686,681 | 8/54 | Nyland. | |
| 2,715,350 | 8/55 | Bedford. | |
| 2,873,121 | 2/59 | Hahn. | |
| 3,107,766 | 10/63 | Pritchard. | |

FOREIGN PATENTS 925,064   3/47   France.

ROBERT C. RIORDON, *Primary Examiner.*

FRANK SUSKO, *Examiner.*